United States Patent [19]
Thrasher

[11] Patent Number: 5,232,199
[45] Date of Patent: Aug. 3, 1993

[54] SLIDING GATE LINE BLIND

[76] Inventor: James R. Thrasher, 913 Sundance, Baton Rouge, La. 70810

[21] Appl. No.: 1,253

[22] Filed: Jan. 6, 1993

Related U.S. Application Data

[63] Continuation of Ser. No. 858,003, Mar. 26, 1992, abandoned.

[51] Int. Cl.⁵ .......................... F16K 3/02; F16K 3/312
[52] U.S. Cl. .................................. 251/196; 138/94.3; 251/272; 251/327; 251/328; 251/900
[58] Field of Search ............... 138/94.3; 251/167, 193, 251/195, 196, 266, 272, 327, 328, 900

[56] References Cited

U.S. PATENT DOCUMENTS

| | | | |
|---|---|---|---|
| Re. 20,101 | 9/1936 | Laurent | 251/196 |
| 2,002,647 | 5/1935 | Sorensen | 251/196 |
| 2,148,628 | 2/1939 | Laurent | 251/196 |
| 2,385,463 | 9/1945 | Penick | 251/196 |
| 2,954,960 | 10/1960 | Dunbar et al. | 251/327 |
| 3,929,316 | 12/1975 | Guthrie | 251/328 |
| 4,116,419 | 9/1978 | Diehl et al. | 251/328 |
| 4,188,016 | 2/1980 | Whaley | 251/196 |
| 4,246,928 | 1/1981 | Burns et al. | 251/196 |
| 4,515,174 | 5/1985 | Hollister et al. | 251/196 |

Primary Examiner—George L. Walton
Attorney, Agent, or Firm—David L. Ray

[57] ABSTRACT

A sliding gate line blind for preventing fluids from traveling downstream from the blind including a body for connection to a pipeline, the body being open to the atmosphere and having an inner portion and an outer portion, the body having an entrance passage and an exit passage, an axially expanding gate assembly slidably received in the body for selectively sealing and opening the pipeline, the expanding gate assembly including two planar surfaces having openings therein for alignment with the entrance passage and the exit passage to permit flow through the pipeline and sealing surfaces for alignment with the entrance passage and exit passage to stop flow through downstream from the sliding gate line blind, and an actuator for moving the expanding gate assembly within the body to selectively seal and open the pipeline.

4 Claims, 3 Drawing Sheets

SLIDING GATE LINE BLIND

This is a continuation, of U.S. application Ser. No. 07/858,003 filed Mar. 26, 1992 now abandoned.

BACKGROUND OF THE INVENTION

1. Field of the Invention

The invention relates to line blinds, and, in particular, to sliding gate line blinds. More particularly, the present invention is related to sliding gate line blind valves.

2. Description of the Related Art

Sliding gate line blinds for preventing leakage of the contents of a pipeline are well known in the art.

U.S. Pat. No. 4,489,918 discloses a non-floating seat for expanding gate valves. To prevent pressure induced floating of the interference fitted seats of expanding gate valves, a seat ring body is provided which is press fitted within the upstream seat recess of a valve body. The seat ring body defines a sealing face of circular form which is disposed for sealing engagement with the segment portion of an expanding gate and segment assembly. The seat ring body also defines an axial extension tube extending upstream from the seat ring body with a circular sealing lip defining the outer periphery thereof being in radial sealing engagement with a reduced diameter portion of the seat recess. The radial extension is pressure yieldable to enhance the radial sealing capability thereof and defines a pressure responsive area that is equal to or less than the pressure responsive area of the sealing face.

U.S. Pat. No. 4,487,393 discloses a gate valve having a pressure-secured seat. The valve includes a valve body having a cavity formed therein and an inlet and outlet formed in the body, both of which intersect the cavity. A counterbore is formed about the circumference of both the inlet and the outlet at their respective intersections with the cavity. An annular seat having a rear surface and a front seat surface is received within the inlet counterbore. An annular seal is formed on the front seat surface and a second annular seal is disposed between the rear surface and the valve body. The front annular seal has a sealing diameter greater than the rear annular seal and an annular recess is formed on the front seat surface on the radially inward side of the annular seal. A second annular seat having a planar front seat surface is received within the outlet counterbore. An expandable gate is mounted for selective vertical positioning in the cavity for permitting flow between the inlet and outlet in one position and for sealing off such flow in another position. When in position for sealing off such flow, the gate is expanded into sealing engagement with the first and second seats.

U.S. Pat. No. 3,923,285 discloses a stem connection for gate valves including a pair of split connector sections which fit over adjacent enlarged end portions of the gate element and stem. The connector sections receive the enlarged end portions in a cavity and a cap fits over the split sections to hold the sections about the enlarged end portions of the gate element and stem. The cap and split sections are rapidly disassembled and reassembled about the enlarged end portions.

U.S. Pat. No. 3,068,901 discloses a three way gate valve including a housing having an open ended internal valve chamber, a detachable bonnet closing the open ended chamber, an inlet port communicating with the chamber, a first outlet port communicating with the chamber, the first outlet port being axially aligned with but diametrically opposed to the inlet port, a second outlet port communicating with the chamber, an annular pocket surrounding the inlet port and first outlet port, one side of each pocket being open to its respective part and another side open to the chamber, a valve seat member located in each of the pockets, a reciprocating two piece parallel expanding type valve member located in the chamber, the valve member having generally parallel sealing faces opposing the seat members and abutting angular faces whereby the valve member can parallelly expand, the valve member having a through passage alignable with the inlet port and first outlet port and a second passage connectable with the inlet port and the second outlet port, the valve member and seat members being so constructed that when the through passage of the valve member is aligned with the inlet port and the first outlet port that the valve member expands to establish seals with the seats from either side and the abutting angular faces contact each other in sealing relationship, a stem extending from the valve member through the bonnet, a device to move the valve member from one position to another.

U.S. Pat. No. 3,060,964 discloses a valve having vented housing including a fluid conduit having a wall with an aperture device therein; a valve seat device in the conduit; a closure device coacting with the valve seat device to open and close the conduit, the closure device extending through the aperture device to the outside of the conduit; a hollow housing on the outside of the conduit enclosing the closure device and the aperture device; a bonnet on the top of the housing; the construction and arrangement being such that fluid may accumulate in the housing while the valve is open and fluid flows through the passage, and that fluid normally is trapped in the housing when the valve is closed thereafter, including two bores through the wall of the conduit on opposite sides of the valve seat device and located within the circumference of the housing, two individual tubes secured in the bores and projecting into the upper portion of the housing beneath the bonnet, the tubes establishing communication between the inside of the conduit and the inside of the housing, and two normally closed independent check valves on the upper ends of and controlling the tubes, the check valves acting to open when the pressure inside the housing exceeds the pressure in the conduit adjacent the respective bores to release fluid to the conduit.

U.S. Pat. No. 2,478,811 discloses a power-operated gate valve of "through conduit" gate type with a fluid pressure device for operating the valve to its open and closed positions, including a pair of double-tapered sliding gate elements that are displaceable in a direction normal to that of their sliding movement by relative endwise movement in order to effect sealing engagement with the valve seats in both the open and closed positions of the valve, a valve housing which completely encloses the valve and its operating device, the operating device including opposed fluid operating pistons in opposite ends of the housing with the gate elements interposed therebetween and with the opposite ends of the gate elements providing abutments to be engaged by the pistons to operate the valve, a lost motion device interconnecting the opposed pistons, and fixed abutments within the housing to limit the sliding movement of one of the gate elements at the opposite ends of the one gate element, the companion element is movable relative thereto in order to laterally displace the two gate elements to effect sealing engagement of both the elements with the valve seats at both ends of the valve travel.

SUMMARY OF THE INVENTION

In accordance with the present invention there is provided a sliding gate line blind for preventing fluids from traveling downstream from the blind. The sliding gate line blind of the invention includes a body for connection to a pipeline, the body being open to the atmosphere and having an inner portion and an outer portion, the body having an entrance passage and an exit passage, an axially expanding gate assembly slidably received in the body for selectively sealing and opening the pipeline, the expanding gate assembly including two planar surfaces having openings therein for alignment with the entrance passage and the exit passage to permit flow through the pipeline and sealing surfaces for alignment with the entrance passage and exit passage to stop flow through downstream from the sliding gate line blind, and an actuator for moving the expanding gate assembly within the body to selectively seal and open the pipeline.

The sliding gate line blind of the invention has the advantage of having a body which is open to the atmosphere so that any leakage of product will go out of the blind body and can be observed or otherwise detected, rather than being forced by a closed body to go downstream to create safety or contamination problems. Furthermore, the open body enables seals or packing to be quickly and easily replaced by removing the expanding gate assembly.

An additional advantage of the sliding gate line blind of the invention is that a positive seal is provided in both the open and closed positions. The present invention operates similar to a simple gate valve while providing a solid skillet plate between two flanges, thereby giving a visible, positive shut-off.

Furthermore, the sliding gate line blind does not require spreading the adjacent lines as is necessary with some line blinds.

BRIEF DESCRIPTION OF THE PREFERRED EMBODIMENTS

Figure 1:
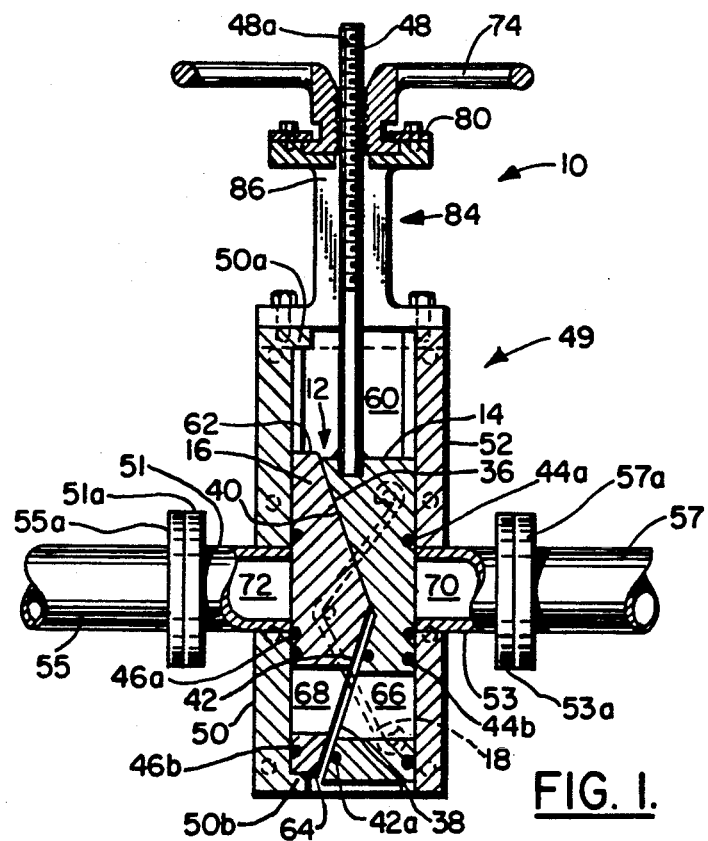
FIG. 1 is a partly cross-sectional, elevational view of a sliding gate line blind of the present invention in the closed and sealed position.

Referring now to the drawings, the sliding gate line blind of the invention generally indicated by the numeral 10 and has an expanding gate assembly generally indicated by the numeral 12. Expanding gate assembly 12 includes gate member 14 and segment member 16.

Gate member 14 and segment member 16 function as two wedges held together by arched wire springs 18 and 20. As can best be seen in FIG. 5, arched wire spring 18 has curved extremities 22 and 24 which contact and engage pins 26 and 28 at the upper and lower extremities of gate member 14. The middle portion of spring 18 contacts and engages pin 30 on segment member 16 which is centrally located on segment member 16.

Figure 5:
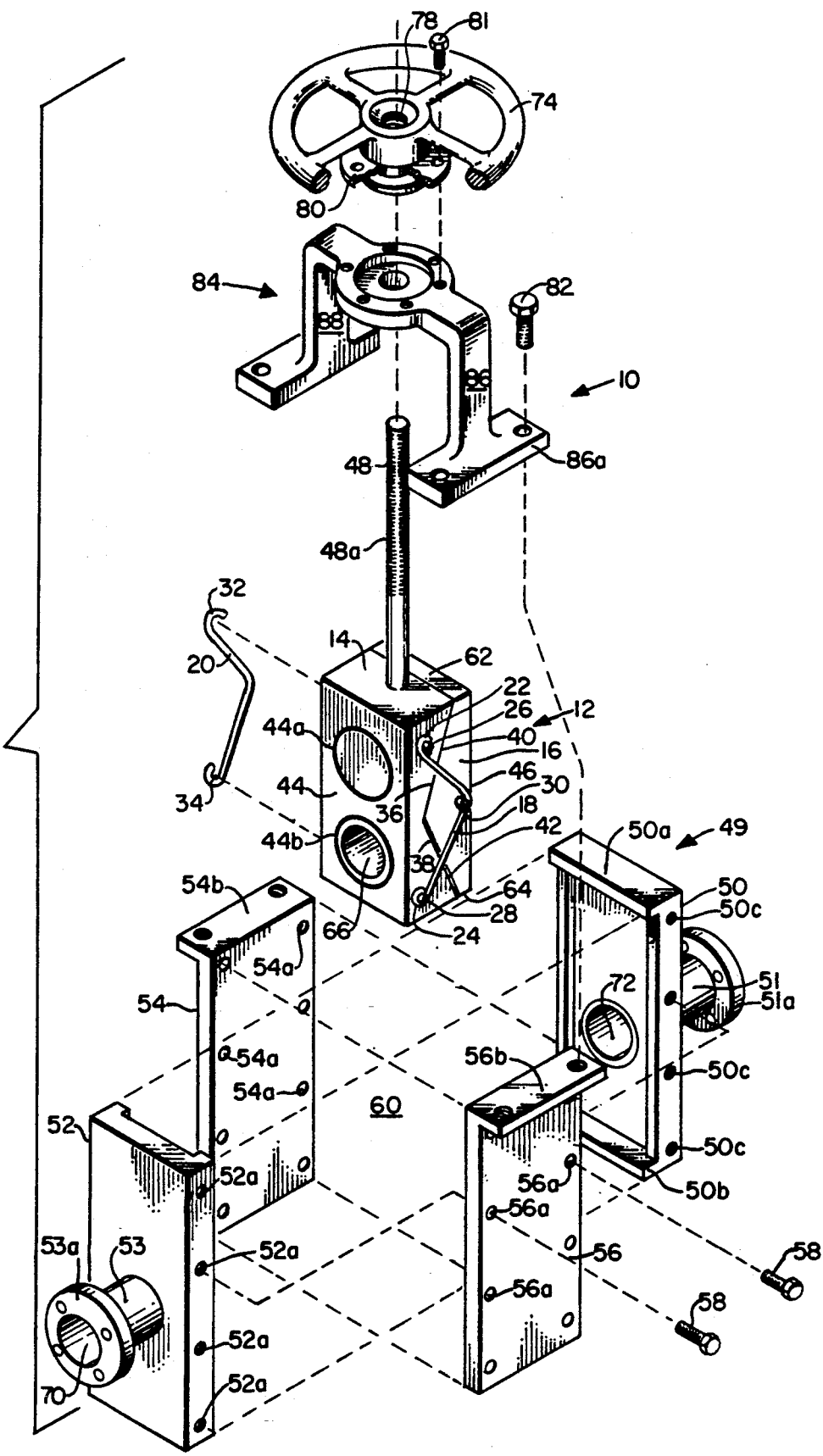
FIG. 5 is a perspective, exploded view of the sliding gate line blind of FIG. 1.

As can best be seen in FIG. 5, arched wire spring 20 has curved extremities 32 and 34 which contact and engage pins(not shown) in alignment with 26 and 28 at the upper and lower extremities of gate member 14 on the opposite side of gate member 14. The middle portion of spring 20 contacts and engages a pin(not shown) in alignment with pin 30 on segment member 16 which is centrally located on the opposite side of segment member 16.

The force developed by the spring wires 18 and 20 on the pins on the gate member 14 and the segment member 16 urge the free segment member 16 toward a fully seated relationship with the gate member 14 so that the angulated surfaces 36 and 38 of segment member 16 are disposed in intimate seated, fully engaging relation with both of the angulated surfaces 40 and 42 of gate member 14. The angulated surfaces 36 and 38 of segment member 16 and the angulated surfaces 40 and 42 of gate member 16 function as planar cam surfaces which control the position of planar sealing face 44 on gate member 14 and planar sealing face 46 on segment member 16.

Gate member 14 is moved linearly by threaded valve stem 48. Valve stem 48 functions as a gate actuating stem and has threads 48a thereon.

Gate assembly 12 is contained and operates in a valve body generally indicated by the numeral 49. Valve body 49 has four generally rectangular sides which include front plate 50, rear plate 52, and side plates 54 and 56. Front plate 50 has pipe or line 51 connected thereto, and rear plate 52 has pipe or line 53 connected thereto. Pipe 51 has flange 51a connected thereto, and pipe 53 has flange 53a connected thereto.

In FIGS. 1-4, sliding gate line blind 10 is shown connected to two pipes or lines 55 and 57. Pipe 55 has flange 55a thereon and pipe 57 has pipe 57a thereon.

Front plate 50 receives rear plate 52 between internal stop pads 50a and 50b. Side plates 54 and 56 are fastened to front plate 50 and rear plate 52 by screws or bolts 58—58 as shown in FIG. 5. Bolts 58—58 are inserted through holes 56a—56a in side plate 56 and are received in threaded holes 50c—50c of front plate 50 and in threaded holes 52a of rear plate 52. Bolts 58—58 are also inserted through holes 54a—54a in side plate 54 and are received in threaded holes(not shown) aligned with holes 50c—50c of front plate 50 on the opposite side of front plate 50, and in threaded holes(not shown) aligned with holes 52a—52a of rear plate 52 on the opposite side of rear plate 52. Thus, plates 50, 52, 54, and 56 are rigidly fastened together to form valve body 49.

Valve body 49 defines a valve chamber 60 within which the expanding gate assembly 12 is linearly movable which also contains internal stop pads 50a and 50b formed on front plate 50 and extending into valve body 49. Internal stop pads 50a and 50b are engageable respectively by the upper extremity 62 and the lower extremity 64 of segment member 16 as the segment member 16 reaches its limits of travel in either direction. The gate member 14 and the segment member 16 also define cylindrical passage 66 and 68 which become aligned with one another and also aligned with cylindrical flow passages 70 and 72 of valve body 49 when the expanding gate assembly 12 is in the fully opened and sealed position shown in FIG. 3.

It is very important that angulated surface 42 of gate member 14 has a seal or packing 42a which extends completely around cylindrical passage 66. Seal 42a is made from a suitable resilient material known in the art which will seal passages 66 and 68 when the expanding gate assembly is in the fully opened and sealed position shown in FIG. 3. Seal 42a prevents escape and leakage along angulated surfaces 36, 38, 40, and 42 in the position shown in FIG. 3. Seal or packing 42a may be a conventional seal or packing known in the art of any configuration. For example, seal or packing 42a could be circular, square, or pentagonal shape or the like so long as the seal extends completely around cylindrical passage 66. Seal or packing 42a is preferably an O-ring having a circular or rectangular cross-section.

It is also very important in preventing leakage along planar sealing face 44, when expanding gate assembly 12 is in the fully closed and sealed position shown in FIG. 1, for planar sealing face 44 of gate member 14 to have seal or packing 44a which extends completely around cylindrical flow passage 70. It is also very important in preventing leakage along planar sealing face 44, when expanding gate assembly 12 is in the fully open and sealed position shown in FIG. 3, for planar sealing face 44 of gate member 14 to have seal or packing 44b which extends completely around cylindrical flow passage 70. Seals or packings 44a and 44b are conventional seals or packings known in the art and may be identical to seal or packing 42a.

Furthermore, it is very important in preventing leakage along planar sealing face 46, when expanding gate assembly 12 is in the fully closed and sealed position shown in FIG. 1, for planar sealing face 46 of segment member 16 to have seal or packing 46a which extends completely around cylindrical flow passage 72. It is also very important in preventing leakage along planar sealing face 46, when expanding gate assembly 12 is in the fully open and sealed position shown in FIG. 3, for planar sealing face 46 of segment member 16 to have seal or packing 46b which extends completely around cylindrical flow passage 72. Seals or packings 46a and 46b are conventional seals or packings known in the art and may be identical to seal or packing 42a.

Handwheel 74 has a threaded hole 78 therein which threadably receives threaded valve stem 48. Handwheel 74 has coupling 80 rotatably connected thereto which is bolted by bolts 81 to the U-shaped handwheel support generally indicated by the numeral 84. Handwheel support 84 has two legs 86 and 88 to which are connected feet 86a and 88a. Feet 86a and 88a are bolted to ledges 54b and 56b of side plates 54 and 56 by bolts 82—82.

Figure 2:
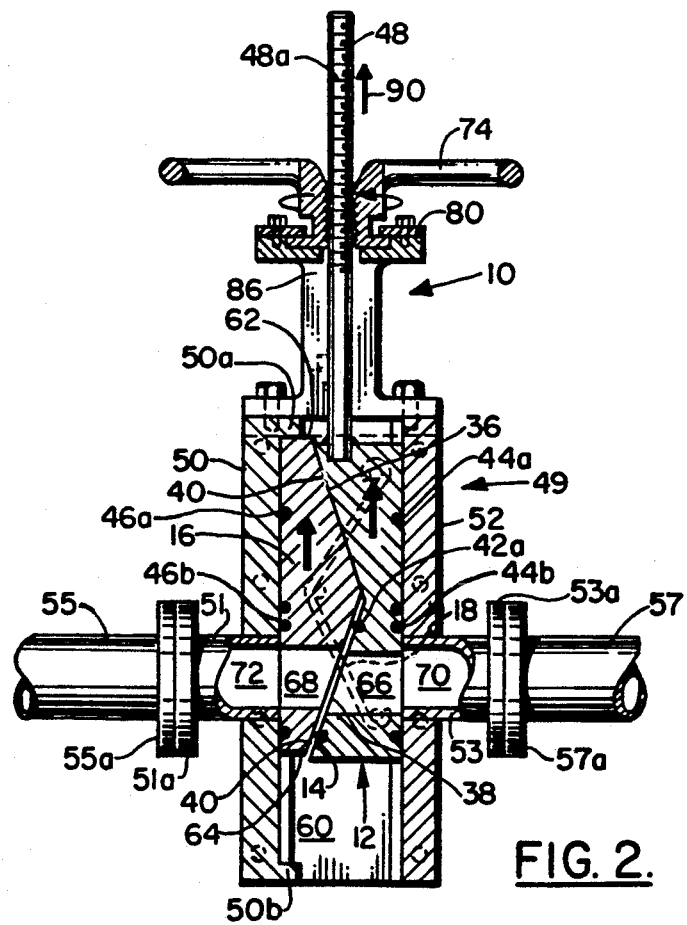
FIG. 2 is a partly cross-sectional, elevational view of the sliding gate line blind of FIG. 1 in the open and unsealed position.
Figure 3:
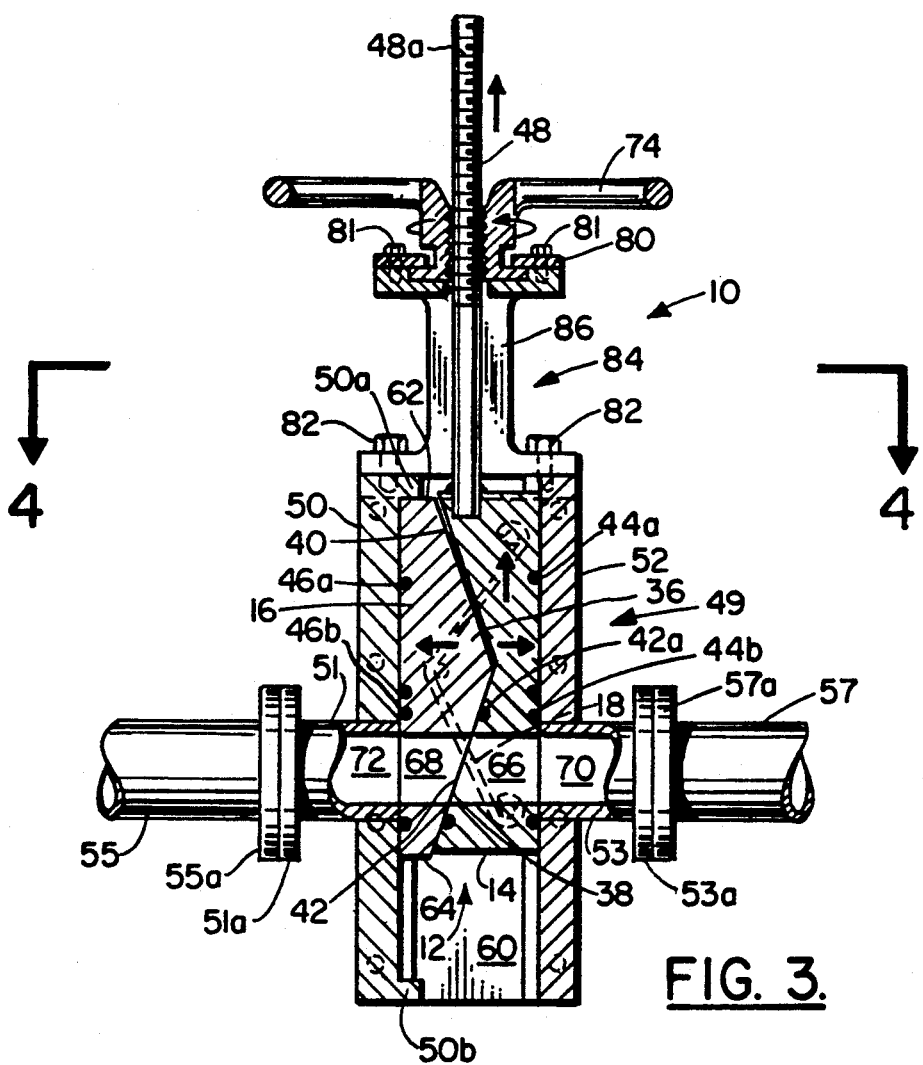
FIG. 3 is a partly cross-sectional, elevational view of a sliding gate line blind of FIG. 1 in the open and sealed position.
Figure 4:
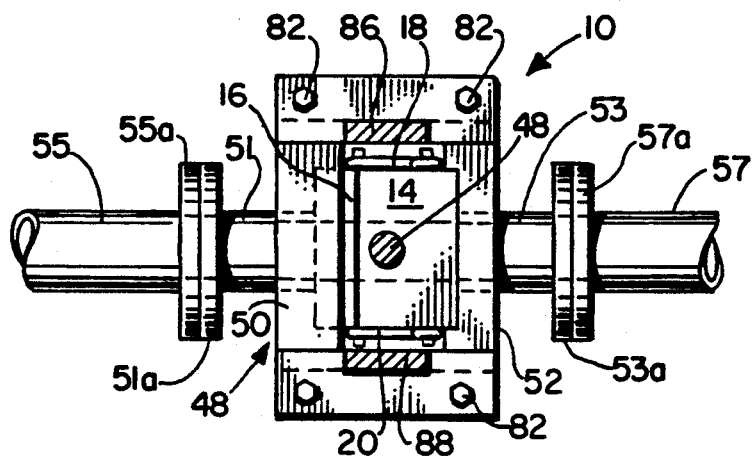
FIG. 4 is a cross sectional view taken along lines 4—4 of FIG. 3.

In order to open the sliding gate line blind 10 shown in the fully closed and sealed position in FIG. 1, handwheel 74 is rotated in the direction indicated by the arrow 76 in FIG. 2 which forces valve stem 48 upward as indicated by the arrow 90. The gate member 14 and segment member 16 move upwardly together as indicated by the arrows thereon in FIG. 2 until the upper extremity 62 of segment member 16 strikes ledge 50a as shown in FIG. 2. Ledge 50a prevents further upward movement of segment member 16 while valve stem 48 continues to move upward causing gate member 14 to continue moving upward. This further upward movement of gate member 14 while segment member 16 is restrained against upward movement by ledge 50a causes relative movement of the angulated planar cam surfaces 40 and 42 of gate member 14 and 36 and 38 of segment member 16. Upward movement of the gate assembly 12 under these conditions causes camming reaction to take place between planar surfaces 36 and 38 of segment member and planar surfaces 40 and 42 of gate member 14, thus causing segment member 16 to be moved transversely to the longitudinal axis of the valve stem 48 as shown by the two horizontal arrows in FIG. 3. When this occurs, angulated surfaces 36 and 40 become separated, and the sealing surfaces 44 and 46 are moved apart until seal or packing 44b seals against rear plate 52, and seal or packing 46b forms a seal with front plate 50. The seating force of gate member 14 and segment member 16 against front plate 50 and rear plate 52 can be increased simply by applying sufficient torque to the valve stem 48 which, through camming activity of the angulated surfaces 36, 38, 40 and 42, develops sufficient expansion force of the gate member 14 and segment member 16 against the front plate 50 and rear plate 52 through seals or packings 44a, 44b, 46a, and 46b to provide a proper seal to prevent leakage and obtain a proper shut off. Seal or packing 42a provides a proper seal to prevent leakage between the gate member 14 and the segment member 16.

An important feature of the sliding gate line blind 10 is that it is open to the atmosphere above gate assembly 12 and below gate assembly 12, but there is no leakage of the contents of cylindrical passages 70 and 72 to the atmosphere or environment around sliding gate line blind 10. Thus, sliding gate line blind 10 has the advantage of being lower in cost than a standard gate valve.

Although the preferred embodiments of the invention have been described in detail above, it should be understood that the invention is in no sense limited thereby, and its scope is to be determined by that of the following claims:

What is claimed is:

1. A sliding gate line blind for attachment to a pipeline to prevent fluids in said pipeline from traveling downstream from said blind comprising:
   a. a body means for connection to said pipeline, said body means being permanently open to the atmosphere above and below said sliding gate line blind, said body means having an inner portion and an outer portion, said body means having an entrance passage and an exit passage,
   b. an axially expanding gate assembly means slidably received in said body means for selectively sealing and opening said pipeline to prevent leakage to the atmosphere when said expanding gate assembly is in the fully open and the fully closed positions, said expanding gate assembly means including a movable gate member and a movable segment member, said movable gate member and said movable segment member each having one of two parallel surfaces thereon, said two parallel surfaces facing the inner portion of said body means, each of said movable gate member and said movable segment member having abutting angular faces whereby said movable gate member and said movable segment member can move relative to each other to force said two parallel surfaces axially against the inner portion of said body means, said movable gate member and said movable segment member each having a passage means extending therethrough from said parallel surface to said abutting angular faces for selective alignment with said entrance passage and said exit passage of said body means, said two parallel surfaces having first seal means surrounding said passage means for preventing leakage of fluids from said sliding gate line blind when said movable gate member and said movable segment member are in an open position to allow fluid flow between said entrance passage and exit passages through said passage means, said first seal means extending completely around said entrance and exit passages, second seal means for preventing leakage of fluids from said sliding gate line blind located on said two parallel surfaces when said two parallel surfaces are in alignment with said entrance passage and said exit passage to stop flow through said sliding gate line blind, said second seal means extending completely around said entrance and said exit passages, third seal means for preventing leakage of fluids between said movable gate member and said movable segment member, said third seal means being located on said movable segment member between said movable segment member and said movable gate member and extending completely around said passage in said movable segment member, said third seal means being in sealing engagement with said movable segment member and said movable gate member only when said movable gate member and said movable segment member are in an open position to allow fluid flow between said entrance and exit passages, and c. actuator means for moving said expanding gate assembly within said body means to selectively seal and open said pipeline.

2. The sliding gate line blind of claim 1 wherein said gate member and said movable segment member are forced toward each other by spring means.

3. The sliding gate line blind of claim 2 wherein said actuator means comprises movable stem means connected to said expanding gate assembly.

4. The sliding gate line blind of claim 3 wherein said stem means is threadably connected to said body means and has a handwheel connected thereto for forcing said stem upward and downward in said body means.

* * * * *